Nov. 4, 1924.
A. R. GROFF
REAR FENDER BRACE
Filed Sept. 10, 1919
1,514,208
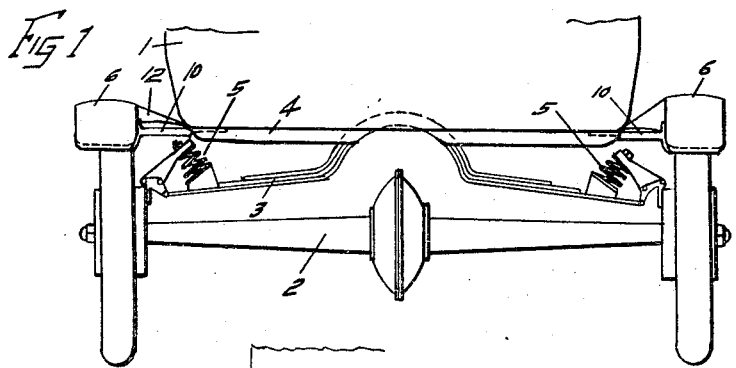
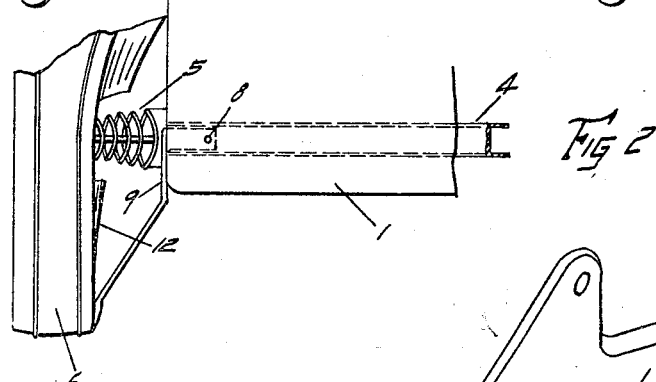
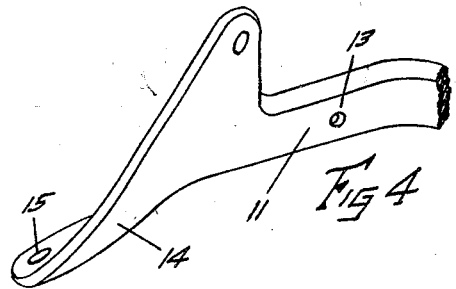
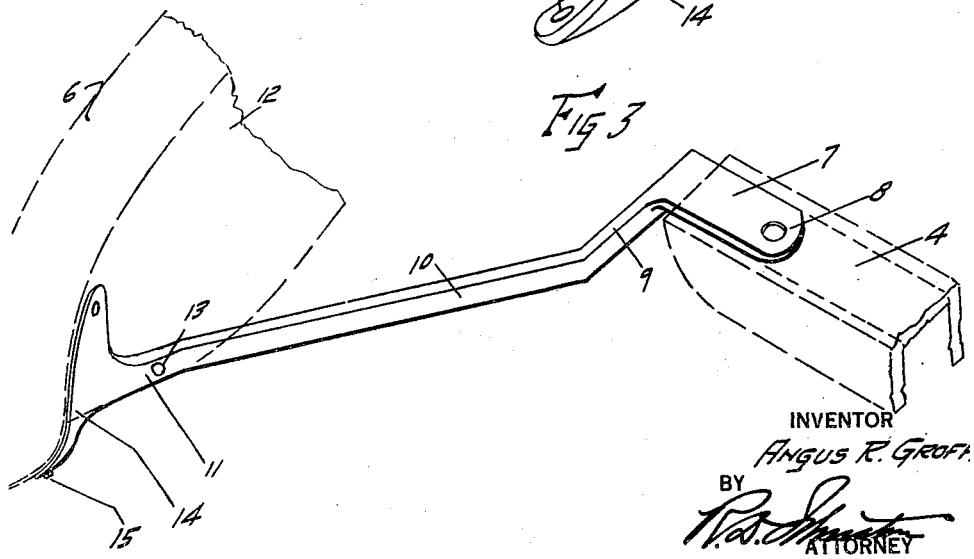
INVENTOR
Angus R. Groff.
BY
ATTORNEY Patented Nov. 4, 1924.

1,514,208

UNITED STATES PATENT OFFICE.

ANGUS R. GROFF, OF BIRMINGHAM, ALABAMA, ASSIGNOR TO ARG AUXILIARY SPRING COMPANY, OF BIRMINGHAM, ALABAMA, A CORPORATION OF ALABAMA.

REAR-FENDER BRACE.

Application filed September 10, 1919. Serial No. 323,004.

*To all whom it may concern:*

Be it known that I, ANGUS R. GROFF, a citizen of the United States of America, residing at Birmingham, in the county of Jefferson, and State of Alabama, have invented certain new and useful Improvements in Rear-Fender Braces, of which the following is a specification.

My invention relates to a rear fender brace for automobiles and is peculiarly though not exclusively designed for use in Ford automobiles.

The object of my invention is to design a rear fender brace which can be attached to the rear channel iron under the body and which will clear the shock absorbers, as customarily applied to the rear springs, and attach to the rear fender at the point calculated to very rigidly brace and support the fender.

My invention well be better understood by reference to the accompanying drawings in which:—

Fig. 1 is a rear perspective view of an automobile equipped with my improved fender braces.

Fig. 2 is a plan view of one rear fender with its brace and the adjacent shock absorber shown in their relative positions.

Fig. 3 is an enlarged perspective view, showing the fender brace in position, and Fig. 4 is a similar view of the rear end of the brace.

Similar reference numerals refer to similar parts throughout the drawings.

I have illustrated my invention as applied to a Ford car having the customary body 1, rear axle 2, rear spring 3 and rear transverse channel iron 4. A typical shock absorber 5 is shown applied to the rear springs and axle and the car is equipped with the usual type of rear fenders 6.

My fender braces are designated for right and left hand use, the brace illustrated in Figs. 2 and 3 being the left hand brace and its description will be sufficient for the right hand brace. Each brace comprises a front end 7 adapted to enter the open end of the channel iron 4 and fit snugly between its down turned side flanges. This end 7 is rigidly connected to the channel iron by a bolt 8, and projects slightly beyond the open end of the channel iron where it joins the portion 9 which is disposed substantially at right angles thereto and extends sufficiently rearward to clear the adjacent shock absorber 5 as is more apparent by reference to Fig. 2. The portion 9 of the brace joins an outwardly and upwardly inclined portion 10, which at its outer end is bent and flattened at 11 to lie flush against the mud guard 12 of the rear fender 6 and is adapted to be attached thereto by a bolt or rivet 13. The extreme rear end of the brace is formed by a vertically elongated member 14, which is curved and shaped to fit snugly to the contour to the flange on the rear fender at its rear end. This member 14 is connected to the fender by a number of rivets or bolts 15.

The brace is so positioned that it acts directly between the channel iron and fender to prevent a downward lateral forward deflection of the fender and to support it with equal strength against a lateral displacement or downward pressure in either direction. The brace as a whole is preferably made as an integral element from either a forging or a malleable casting and it is an important feature of my invention that the brace be adapted for attachment to the channel iron and at the same time to avoid interference with any standard type of shock absorber.

My brace also reinforces the attachment of the mud guard 12 to the fender and serves to brace the mud guard itself.

What I claim as new and desire to secure by Letters Patent is:—

In combination, an automobile body having a transverse channel iron mounted above its rear axle, a brace for a rear fender comprising a forward end adapted to fit snugly into an open end of the channel iron and to be rigidly attached thereto by the original body bolt which attaches the channel iron to the body, a rearwardly and substantially horizontally disposed body having its forward end extending rearwardly substantially from and at right angles to the channel iron so as to clear a shock absorber, and then extending rearwardly, upwardly and outwardly to the rear inner end of the fender, said body having at its rear end a vertically elongated curved flange adapted to fit the rear fender flange, substantially as described.

In testimony whereof I ANGUS R. GROFF affix my signature.

ANGUS R. GROFF.

Witness:
H. H. K. JEFFERSON.